US012704671B2

(12) United States Patent
Iwaguchi et al.

(10) Patent No.: US 12,704,671 B2
(45) Date of Patent: Aug. 11, 2026

(54) OPTICAL FIBER AND OPTICAL FIBER RIBBON

(71) Applicant: SUMITOMO ELECTRIC INDUSTRIES, LTD., Osaka (JP)

(72) Inventors: Noriaki Iwaguchi, Osaka (JP); Miho Ikegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 336 days.

(21) Appl. No.: 18/279,474

(22) PCT Filed: Jan. 27, 2022

(86) PCT No.: PCT/JP2022/003112
§ 371 (c)(1),
(2) Date: Aug. 30, 2023

(87) PCT Pub. No.: WO2022/190693
PCT Pub. Date: Sep. 15, 2022

(65) Prior Publication Data

US 2024/0302585 A1 Sep. 12, 2024

(30) Foreign Application Priority Data

Mar. 11, 2021 (JP) ................................ 2021-039007

(51) Int. Cl.
*G02B 6/02* (2006.01)
*C03C 25/105* (2018.01)
(Continued)

(52) U.S. Cl.
CPC ........ *G02B 6/02395* (2013.01); *C03C 25/105* (2013.01); *C03C 25/1065* (2013.01); *C03C 25/285* (2013.01); *C03C 25/36* (2013.01)

(58) Field of Classification Search
CPC .............. G02B 6/02395; C03C 25/105; C03C 25/1065; C03C 25/285; C03C 25/36
See application file for complete search history.

(56) References Cited

U.S. PATENT DOCUMENTS 6,198,867 B1 3/2001 Yamamoto et al.
6,528,553 B1 * 3/2003 Komiya .............. C08G 18/289 522/182

(Continued)

FOREIGN PATENT DOCUMENTS

JP 2000-026559 A 1/2000
JP 2002-338641 A 11/2002

(Continued)

OTHER PUBLICATIONS

Fu et al., Effects of particle size, particle/matrix interface adhesion and particle loading on mechanical properties of particulate-polymer composites, Composites Part B: Engineering, vol. 39, Issue 6, 2008, pp. 933-961, ISSN 1359-8368, https://doi.org/10.1016/j.compositesb.2008.01.002. (Year: 2008).*

(Continued)

*Primary Examiner* — Peter Radkowski
(74) *Attorney, Agent, or Firm* — Faegre Drinker Biddle & Reath LLP

(57) ABSTRACT

An optical fiber comprises a glass fiber including a core and a cladding, and a coating resin layer for coating the glass fiber; the coating resin layer has a primary resin layer in contact with the glass fiber for coating the glass fiber, and a secondary resin layer for coating the primary resin layer; the primary resin layer includes a cured product of a first resin composition containing a silicone (meth)acrylate and a photopolymerization initiator; the secondary resin layer includes a cured product of a second resin composition containing a urethane (meth)acrylate and a photopolymer- (Continued)

ization initiator; and the amount of tin contained in the coating resin layer is 150 ppm or less in a mass ratio.

17 Claims, 2 Drawing Sheets

(51) Int. Cl.
*C03C 25/1065* (2018.01)
*C03C 25/285* (2018.01)
*C03C 25/36* (2006.01)

(56) References Cited

U.S. PATENT DOCUMENTS

| | | | | |
|---|---|---|---|---|
| 6,858,657 | B2 * | 2/2005 | Komiya | C08G 18/4866 522/182 |
| 7,076,142 | B2 * | 7/2006 | Bishop | G01N 3/18 385/128 |
| 7,226,958 | B2 * | 6/2007 | Cattron | C09D 175/16 522/174 |
| 2002/0161154 | A1 * | 10/2002 | Cattron | C03C 25/1065 522/90 |
| 2004/0014835 | A1 * | 1/2004 | Komiya | C08F 290/147 522/90 |
| 2004/0105643 | A1 * | 6/2004 | Bishop | C03C 25/1065 385/128 |
| 2005/0228063 | A1 * | 10/2005 | Komiya | C09D 175/16 522/96 |
| 2007/0203321 | A1 * | 8/2007 | Cattron | C03C 25/106 528/44 |
| 2015/0131956 | A1 | 5/2015 | Iwaguchi et al. | |
| 2017/0242187 | A1 | 8/2017 | Iwaguchi et al. | |
| 2021/0009854 | A1 | 1/2021 | Hamakubo | |
| 2021/0181411 | A1 | 6/2021 | Iwaguchi et al. | |

FOREIGN PATENT DOCUMENTS

| | | | |
|---|---|---|---|
| WO | WO-2014/168201 | A1 | 10/2014 |
| WO | WO-2017/065274 | A1 | 4/2017 |
| WO | WO-2019/221248 | A1 | 11/2019 |
| WO | WO-2020/101030 | A1 | 5/2020 |
| WO | WO-2020/255569 | A1 | 12/2020 |
| WO | WO-2020/255830 | A1 | 12/2020 |
| WO | WO-2021/019908 | A1 | 2/2021 |

OTHER PUBLICATIONS

Javadi et al., Stretching Micro Metal Particles into Uniformly Dispersed and Sized Nanoparticles in Polymer, SCiEntific REPOrTS | 7: 7098 | DOI:10.1038/s41598-017-07788-3, 2. 2017 (Year: 2017).*

Lin et al., Fabrication of Metal-Polymer Nanocomposites by In-Fiber Instability. ASME. J. Micro Nano-Manuf. Dec. 2016; 4(4):041008. https://doi.org/10.1115/1.4034612 (Year: 2016).*

Sengwa, Priyanka Dhatarwal, Polymer nanocomposites comprising PMMA matrix and ZnO, SnO2, and TiO2 nanofillers: A comparative study of structural, optical, and dielectric properties for multi-functional technological applications, Optical Materials, vol. 113, Jan. 2021,110837 (Year: 2021).*

Sikora, Janusz W., Modifying Effect of Metallic Powder Fillers, Acta Mechanica Slovaca 19 4): 26-31, 2015 (Year: 2015).*

Suberlyak et al., Influence of the Metal Surface of Powder Filler on the Structure and Properties of Composite Materials Based on the Copolymers of Methacrylates with Polyvinylpyrrolidone. Mater Sci 52, 155-164 (2016). https://doi.org/10.1007/s11003-016-9938-9 (Year: 2016).*

Tao et al., Preparation and Optical Properties of Indium Tin Oxide/ Epoxy Nanocomposites with Polyglycidyl Methacrylate Grafted Nanoparticles, ACS Applied Materials & Interfaces 2011 3 (9), 3638-3645, DOI: 10.1021/am200841n (Year: 2011).*

Thakur et al., Effect of nanoparticles on epoxy based composites: A short review, Materials Today: Proceedings, vol. 44, Part 6, 2021, pp. 4640-4642, ISSN 2214-7853, online Dec. 16, 2020, (Year: 2021).*

Voo et al., Properties of epoxy nanocomposite thin films prepared by spin coating technique. Journal of Plastic Film and Sheeting. 2011. 27. 331-346. 10.1177/8756087911419745. (Year: 2011).*

* cited by examiner

OPTICAL FIBER AND OPTICAL FIBER RIBBON

TECHNICAL FIELD

The present disclosure relates to an optical fiber and an optical fiber ribbon.

The present application claims priority based on Japanese Patent Application No. 2021-039007 filed on Mar. 11, 2021, and incorporates all the content described in the Japanese Patent Application.

BACKGROUND ART

Generally, an optical fiber has a coating resin layer for protecting a glass fiber as light transmitting medium. The coating resin layer includes, for example, two layers consisting of a primary resin layer in contact with the glass fiber and a secondary resin layer formed as outer layer of the primary resin layer.

In order to improve low temperature properties of an optical fiber through lowering the Young's modulus of the primary resin layer, formation of a primary resin layer from a silicone resin having small changes in Young's modulus between low temperature and normal temperature has been studied (for example, refer to Patent Literature 1).

CITATION LIST

Patent Literature

Patent Literature 1: JP 2000-26559 A

SUMMARY OF INVENTION

The optical fiber according to one aspect of the present disclosure comprises a glass fiber including a core and a cladding, and a coating resin layer for coating the glass fiber; the coating resin layer has a primary resin layer in contact with the glass fiber for coating the glass fiber, and a secondary resin layer for coating the primary resin layer; the primary resin layer includes a cured product of a first resin composition containing a silicone (meth)acrylate and a photopolymerization initiator; the secondary resin layer includes a cured product of a second resin composition containing a urethane (meth)acrylate and a photopolymerization initiator; and the amount of tin contained in the coating resin layer is 150 ppm or less in a mass ratio.

DESCRIPTION OF EMBODIMENTS

Figure 1:
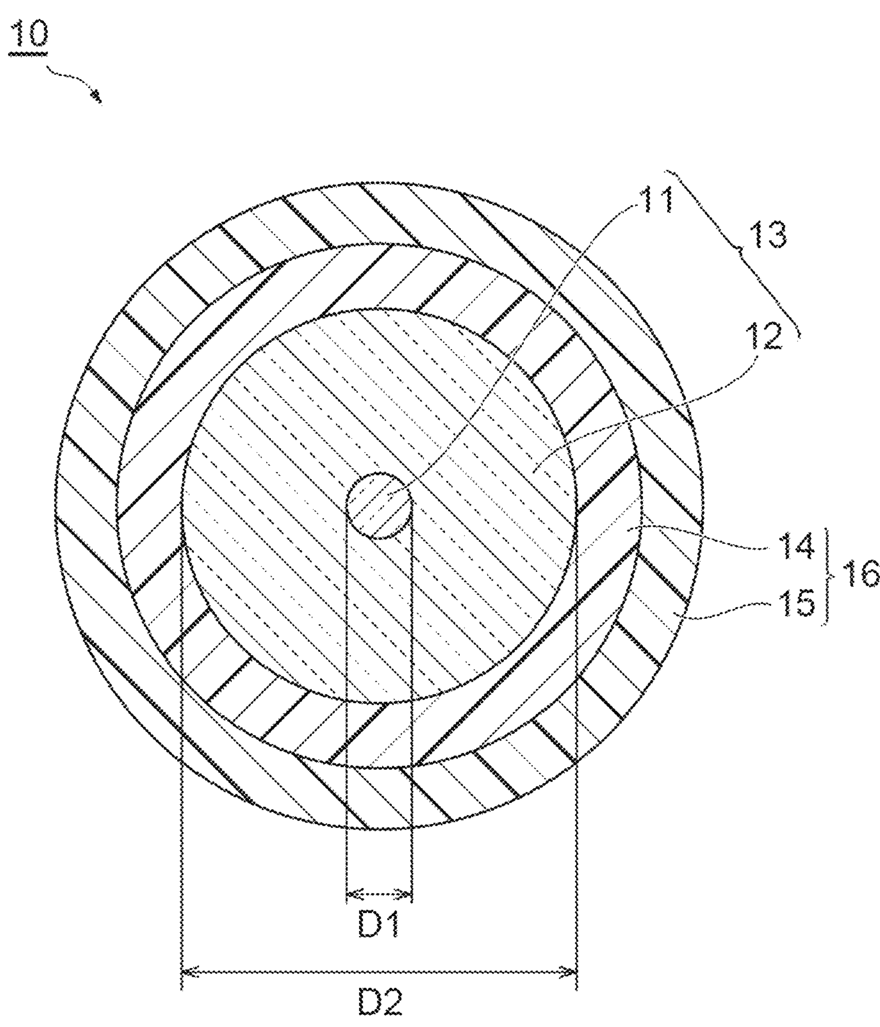
FIG. 1 is a cross-sectional view showing an example of an optical fiber according to the present embodiment.

Problem to be Solved by the Present Disclosure

In a loose tube-type optical cable as one of the use form of optical fibers, the optical fiber is accommodated in the optical cable together with a filler mainly composed of hydrocarbon-based oil. The toughness of the coating resin layer of an optical fiber tends to decrease along with absorption of the hydrocarbon-based oil. A primary resin layer having a low Young's modulus absorbs more oil, and in particular, a silicone resin tends to easily absorb oil due to having low polarity. A coating resin layer with oil absorbed has reduced adhesion to the glass fiber and the transmission characteristics of the optical fiber at low temperature may be degraded. Accordingly, the coating resin layer of an optical fiber is required to have superior oil resistance.

An object of the present disclosure is to provide an optical fiber having a coating resin layer with superior oil resistance, which can achieve superior transmission characteristics at low temperature, and an optical fiber ribbon.

Effects of the Present Disclosure

According to the present disclosure, an optical fiber having a coating resin layer with superior oil resistance, which can achieve superior transmission characteristics at low temperature, and an optical fiber ribbon can be provided.

DESCRIPTION OF EMBODIMENTS OF THE PRESENT DISCLOSURE

First, the embodiments of the present disclosure will be listed and described. The optical fiber according to one aspect of the present disclosure comprises a glass fiber including a core and a cladding, and a coating resin layer in contact with the glass fiber for coating the glass fiber. The coating resin layer has a primary resin layer in contact with the glass fiber for coating the glass fiber, and a secondary resin layer for coating the primary resin layer. The primary resin layer includes a cured product of a first resin composition containing a silicone (meth)acrylate and a photopolymerization initiator and the secondary resin layer includes a cured product of a second resin composition containing a urethane (meth)acrylate and a photopolymerization initiator; and the amount of tin contained in the coating resin layer is 150 ppm or less in a mass ratio.

The optical fiber having a coating resin layer including a primary resin layer containing a silicone resin and a secondary resin layer containing a urethane (meth)acrylate resin may have deteriorated transmission characteristics when exposed to low temperature after absorption of oil. Through observation of an optical fiber having deteriorated transmission characteristics, the present inventors have found that occurrence of delamination between the primary resin layer and the glass fiber in the presence of a tin component at the delamination spot. Since a tin catalyst is used in synthesis of the urethane (meth)acrylate, it is conceivable that a component derived from the tin catalyst has migrated into the primary resin layer. Accordingly, the present inventors have believed that the pre-adjustment of the amount of tin catalyst in synthesis of the urethane (meth)acrylate used for the secondary resin layer is effective for suppression of the migration of tin component to the primary resin, and have found the composition of the optical fiber according to the present disclosure. The optical fiber according to the present embodiment includes a coating resin layer having superior oil resistance, achieving superior transmission characteristics at low temperature.

From the viewpoint of improving balance between the lateral pressure characteristics and the oil resistance of the optical fiber at low temperature, 80 MPa or more and 2000 MPa or less at 23° C. is preferred.

It is preferable that the second resin composition further contain an epoxy (meth)acrylate having an aromatic ring. Use of the epoxy (meth)acrylate having an aromatic ring enhances the surface hardness of the secondary resin layer, so that the deformation of the coating resin layer can be suppressed. As a result, the lateral pressure characteristics of the optical fiber can be further improved. Further, due to the effect of the noncovalent bond between aromatic rings, the component can suppress the migration of the tin catalyst to the primary resin.

The optical fiber ribbon according to the present disclosure comprises a plurality of the optical fibers arranged in parallel and a connecting resin layer for coating and connecting a plurality of the optical fibers. Such an optical fiber ribbon has superior transmission characteristics at low temperature.

DETAILS OF EMBODIMENTS OF THE PRESENT DISCLOSURE

Specific examples of the optical fiber and the optical fiber ribbon according to embodiments of the present disclosure will be described with reference to drawings on an as needed basis. The present disclosure is not limited to these examples, being shown in the scope of claims and intended to include equivalents to the claims and all modifications within the scope of the claims. In the following description, the same elements will be denoted by the same reference numerals in the description of the drawings, and duplicate description will be omitted. In the present embodiment, a (meth)acrylate means an acrylate or a methacrylate corresponding thereto, and the same applies to other similar expressions such as a (meth)acryloyl.

(Optical Fiber)

FIG. 1 is a schematic cross-sectional view showing an example of an optical fiber. An optical fiber 10 includes a glass fiber 13 including a core 11 and a cladding 12, and a coating resin layer 16 including a primary resin layer 14 and a secondary resin layer 15 provided on the outer periphery of a glass fiber 13.

The cladding 12 surrounds the core 11. The core 11 and the cladding 12 mainly include glass such as silica glass. For example, the core 11 may be made of silica glass with addition of germanium or pure silica glass, and the cladding 12 may be made of pure silica glass or silica glass with addition of fluorine.

In FIG. 1, for example, the outer diameter (D2) of the glass fiber 13 is about 100 μm to 125 μm, and the diameter (D1) of the core 11 constituting the glass fiber 13 is about 7 μm to 15 μm. The thickness of the coating resin layer 16 is usually about 22 μm to 70 μm. The thickness of each of the primary resin layer 14 and the secondary resin layer 15 may be about 5 μm to 50 μm.

In the case where the outer diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, and, for example, the thickness of the primary resin layer 14 may be 35 μm and the thickness of the secondary resin layer 15 may be 25 μm. The outer diameter of the glass fiber 10 may be about 245 μm to 265 μm.

In the case where the outer diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, and, for example, the thickness of the primary resin layer 14 may be 25 μm and the thickness of the secondary resin layer 15 may be 10 μm. The outer diameter of the glass fiber 10 may be about 179 μm to 221 μm.

In the case where the outer diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, and, for example, the thickness of the primary resin layer 14 may be 25 μm and the thickness of the secondary resin layer 15 may be 10 μm. The outer diameter of the glass fiber 10 may be about 144 μm to 174 μm.

From the viewpoint of enhancing the oil resistance of the coating resin layer to improve the transmission characteristics of the optical fiber at low temperature, the amount of tin contained in the coating resin layer 16 is 150 ppm or less, preferably 120 ppm or less, more preferably 100 ppm or less, and still more preferably 80 ppm or less, based on the total amount of the coating resin layer. A smaller amount of tin contained in the coating resin layer 16 is more preferred. However, since tin is added as catalyst for synthesizing a urethane acrylate resin, the synthesis may take too much time or no synthesis may occur with an excessively small amount of tin. Accordingly, the lower limit of the amount of tin may be 10 ppm or more, 20 ppm or more, 40 ppm or more, or 50 ppm or more. In the present specification, the amount of tin (ppm) is expressed in a mass ratio.

The primary resin layer 14 may be formed by curing a first resin composition containing a silicone (meth)acrylate and a photopolymerization initiator. The first resin composition is an ultraviolet curable resin composition. The primary resin layer 14 containing a resin component derived from the silicone (meth)acrylate enhances adhesion of the primary resin layer to the glass fiber and improves the oil resistance of the coating resin layer.

As the silicone (meth)acrylate, a compound having a (meth)acryloyl group at both ends of a siloxane structure may be used. The silicone (meth)acrylate may be a compound obtained by reacting a silane compound having a (meth)acryloyl group and a cyclic polysiloxane.

Examples of the silicone (meth)acrylate include a silicone di(meth)acrylate expressed by the following formula (1):

[Chemical Formula 1]

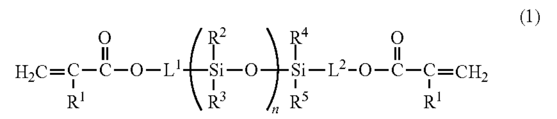

(1)

In the formula (1), $R^1$ represents a hydrogen atom or a methyl group, $R^2$, $R^3$, $R^4$ and $R^5$ each independently represent a monovalent hydrocarbon group, $L^1$ and $L^2$ each independently represent a divalent hydrocarbon group, and n is an integer of 10 or more and 1200 or less.

Examples of the monovalent hydrocarbon group include a linear, branched or cyclic alkyl group having 1 to 6 carbon atoms, an aryl group having 6 to 10 carbon atoms, and an aralkyl group having 7 to 10 carbon atoms. The monovalent hydrocarbon group may be at least one group selected from a group consisting of a methyl group, an ethyl group, a phenyl group and a benzyl group. Examples of the divalent hydrocarbon group include an alkylene group having 1 to 5 carbon atoms. The divalent hydrocarbon group may be at least one group selected from a group consisting of a methylene group, an ethylene group and a propylene group. Here, n may be 50 or more and 1000 or less, 80 or more and 800 or less, or 100 or more and 600 or less.

As the silicone (meth)acrylate, for example, a compound described in JP 2000-26559 A may be used.

The secondary resin layer 15 may be formed by curing a second resin composition containing a urethane (meth) acrylate and a photopolymerization initiator. The second resin composition is an ultraviolet curable resin composition. The secondary resin layer 15 containing a resin component derived from the urethane (meth)acrylate makes the Young's modulus of the secondary resin layer higher than that of the primary resin layer.

The urethane (meth)acrylate may be a compound obtained by reacting a polyol compound, a polyisocyanate compound, and a hydroxyl group-containing (meth)acrylate compound.

Examples of the polyol compound include polytetramethylene glycol, polypropylene glycol, and bisphenol A/ethylene oxide addition diol. From the viewpoint of adjusting the Young's modulus, the number average molecular weight (Mn) of the polyol compound may be 300 or more and 8000 or less, preferably 400 or more and 5000 or less, more preferably 600 or more and 4000 or less, and still more preferably 700 or more and 3500 or less. Examples of the polyisocyanate compound include 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate and tripropylene glycol (meth)acrylate.

An organotin compound is used as a catalyst for synthesizing the urethane (meth)acrylate. Examples of the organotin compound include dibutyltin dilaurate, dibutyltin diacetate, dibutyltin malate, dibutyltin bis(2-ethylhexyl mercaptoacetate), dibutyltin bis(isooctyl mercaptoacetate), and dibutyltin oxide. From the viewpoint of easy availability or catalytic performance, it is preferable to use dibutyltin dilaurate or dibutyltin diacetate as the catalyst. The urethane (meth)acrylate contains tin derived from an organic tin compound. Depending on the amount of an organic tin compound added in synthesis of the urethane (meth)acrylate, the amount of tin contained in the coating resin layer may be adjusted.

A lower alcohol having 5 or less carbon atoms may be used for synthesizing the urethane (meth)acrylate. Examples of the lower alcohol include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

From the viewpoint of enhancing the Young's modulus of the secondary resin layer, the second resin composition may further contain an epoxy (meth)acrylate. Epoxy (meth)acrylate is a compound obtained by reacting an epoxy compound having two or more glycidyl groups with a compound having a (meth)acryloyl group. In order to improve the lateral pressure characteristics, it is preferable that the epoxy (meth)acrylate have an aromatic ring. Examples of the epoxy (meth)acrylate having an aromatic ring include a novolac epoxy (meth)acrylate, trade name "Biscoat #540" manufactured by Osaka Organic Chemical Industry Ltd., and trade names "Epoxy ester 3002M", "Epoxy ester 3002A", "Epoxy ester 3000MK", and "Epoxy ester 3000A" manufactured by Kyoeisha Chemical Co., Ltd.

The content of the epoxy (meth)acrylate based on the total amount of the resin composition may be 5 parts by mass or more, 10 parts by mass or more, 15 parts by mass or more, or 20 parts by mass or more, and 70 parts by mass or less, 65 parts by mass or less, 60 parts by mass or less, or 50 parts by mass or less.

The resin composition according to the present embodiment may further contain a photopolymerizable compound (hereinafter referred to as "monomer") other than a silicone (meth)acrylate, a urethan (meth)acrylate, and an epoxy (meth)acrylate. As the monomer, a monofunctional monomer having one polymerizable group and a polyfunctional monomer having two or more polymerizable groups may be used. Two or more types of monomers may be mixed for use.

Examples of the monofunctional monomer include (meta) acrylate-based monomers such as methyl (meth)acrylate, ethyl (meth)acrylate, propyl (meth)acrylate, n-butyl (meth) acrylate, s-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meta)acrylate, isooctyl (meth)acrylate, isodecyl (meth) acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenolpolyethylene glycol (meta) acrylate, nonylphenol ethylene oxide-modified (meth)acrylate, nonylphenoxypolyethylene glycol (meth)acrylate, and isobornyl (meth)acrylate; carboxyl group-containing monomers such as (meth)acrylic acid, (meth)acrylic acid dimer, carboxyethyl (meth)acrylate, carboxypentyl (meth)acrylate, and ω-carboxy-polycaprolactone (meth)acrylate; heterocyclic ring-containing (meth)acrylates such as N-acryloyl morpholine, N-vinylpyrrolidone, N-vinylcaprolactam, N-acryloyl piperidine, N-methacryloyl piperidine, N-acryloyl pyrrolidine, 3-(3-pyridyl)propyl (meth)acrylate, and cyclic trimethylolpropane formal acrylate; maleimide-based monomers such as maleimide, N-cyclohexyl maleimide, and N-phenyl maleimide; amide-based monomers such as (meth)acrylamide, N,N-dimethyl (meth)acrylamide, N,N-diethyl (meth)acrylamide, N-hexyl (meth)acrylamide, N-methyl (meth)acrylamide, N-ethyl (meth)acrylamide, N-butyl (meth)acrylamide, N-methylol (meth)acrylamide, and N-methylolpropane (meth)acrylamide; aminoalkyl (meth)acrylate-based monomers such as aminoethyl (meth) acrylate, aminopropyl (meth)acrylate, N,N-dimethylaminoethyl (meth)acrylate, and tert-butylaminoethyl (meth)acrylate; and succinimide-based monomers such as N-(meth) acryloyl oxymethylene succinimide, and N-(meth)acryloyl-6-oxyhexamethylene succinimide, and N-(meth)acryloyl-8-oxyoctamethylene succinimide.

Examples of the polyfunctional monomer include ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, neopentyl glycol hydroxypivalate di(meth)acrylate, 1,4-butanediol di(meth) acrylate, 1,6-hexanediol di(meth)acrylate, 1,9-nonanediol di(meth)acrylate, 1,12-dodecanediol di(meth)acrylate, 1,14-tetradecanediol di(meth)acrylate, 1,16-hexadecane diol di(meth)acrylate, 1,20-eicosane diol di(meth)acrylate, isopentyl diol di(meth)acrylate, 3-ethyl-1,8-octane diol di(meth)acrylate, di(meth)acrylate of ethylene oxide adduct of bisphenol A, trimethylolpropane tri(meth)acrylate, trimethyloloctane tri(meth)acrylate, trimethylolpropane polyethoxy tri(meth)acrylate, trimethylolpropane polypropoxy tri(meth)acrylate, trimethylolpropane polyethoxypolypropoxy tri(meth)acrylate, tris[(meth)acryloyloxyethyl]isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meta)acryloyloxyethyl]isocyanurate.

The photopolymerization initiator for use may be appropriately selected from known radical photopolymerization initiators. Examples of the photopolymerization initiators include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropane-1-one, bis(2,6-dimethoxybenzoyl)-2,4,4-trimethylpentylphosphine oxide, 2-methyl-1-[4-(methylthio)phenyl]-2-morpholino-propane-1-one (Omnirad 907, manufactured by IGM Resins), 2,4,6-trimethylbenzoyldiphenylphosphine oxide (Omnirad TPO, manufactured by IGM Resins), and bis(2,4,6-trimethylbenzoyl)phenylphosphine oxide (Omnirad 819, manufactured by IGM Resins).

The resin composition according to the present embodiment may further contain a silane coupling agent, a photoacid generator, a leveling agent, an antifoaming agent, an antioxidant, a sensitizer, etc.

The silane coupling agent is not particularly limited as long as it causes no inhibition in curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, and β-(3,4-epoxycyclohexyl)-ethyltrimethoxysilane, dimethoxydimethylsilane, diethoxydimethylsilane, 3-acryloxypropyl trimethoxysilane, 3-glycidoxypropyl trimethoxysilane, 3-glycidoxypropylmethyl diethoxysilane, 3-methacryloxypropyl trimethoxysilane, N-(β-aminoethyl)-γ-aminopropyltrimethoxysilane, N-(β-aminoethyl)-γ-aminopropyltrimethyl dimethoxysilane, N-phenyl-3-aminopropyl trimethoxysilane, 3-chloropropyl trimethoxysilane, 3-mercaptopropyl trimethoxysilane, 3-aminopropyl trimethoxysilane, bis-[3-(triethoxysilyl)propyl]tetrasulfide, bis-[3-(triethoxysilyl)propyl]disulfide, γ-trimethoxysilylpropyl dimethylthiocarbamyl tetrasulfide, and γ-trimethoxysilylpropyl benzothiazyl tetrasulfide.

As the photoacid generator, an onium salt having an $A^+B^-$ structure may be used. Examples of the photoacid generator include a sulfonium salt such as UVACURE1590 (manufactured by Daicel-Cytec), CPI-100P, 110P, and 210S (manufactured by San-Apro), and an iodonium salt such as Omnicat 250 (manufactured by IGM Resins), WPI-113 (manufactured by Fujifilm Wako Pure Chemical Corporation), and Rp-2074 (manufactured by Rhodia Japan).

From the viewpoint of improving the lateral pressure characteristics of the optical fiber, a lower Young's modulus of the primary resin layer is more preferred. On the other hand, since the curability of the resin decreases with decrease in the Young's modulus, an appropriate Young's modulus is required. The Young's modulus of the primary resin layer 14 at 23° C. is preferably 0.04 MPa or more and 2.0 MPa or less, more preferably 0.05 MPa or more and 1.8 MPa or less, and still more preferably 0.06 MPa or more and 1.5 MPa or less.

From the viewpoint of enhancing the rigidity of an optical fiber to improve the lateral pressure characteristics, a higher Young's modulus of the secondary resin layer 15 is preferred. On the other hand, with increase in the difference of Young's modulus between the primary resin layer and the secondary resin layer, the difference in cure shrinkage between the resin layers increases, so that delamination is likely to occur at the interface between the primary resin layer and the glass fiber. The Young's modulus of the secondary resin layer at 23° C. is preferably 80 MPa or more and 2000 MPa or less, more preferably 180 MPa or more and 1800 MPa or less, and still more preferably 300 MPa or more and 1600 MPa or less.

The optical fiber according to the present embodiment may be prepared by a method including a coating step of applying a first resin composition and a second resin composition to the outer periphery of a glass fiber, and a curing step of irradiating ultraviolet rays to cure the resin composition after the coating step.

In the coating step, the first resin composition is applied to the surface of the glass fiber 13 to form a first resin layer (corresponding to the primary resin layer 14 after curing) of the first resin composition on the surface of the glass fiber 13, and the second resin composition is applied to the surface of the first resin layer to form a second resin layer (corresponding to the secondary resin layer 15 after curing) of the second resin composition on the surface of the first resin layer.

In the curing step, the first resin layer and the second resin layer are cured by irradiation of ultraviolet rays, so that the primary resin layer 14 is formed from the first resin layer and the secondary resin layer 15 is formed from the second resin layer. Examples of the light source of ultraviolet rays include an ultraviolet ray LED and a ultraviolet ray lamp.

On the outer peripheral surface of the secondary resin layer 15 to constitute the coating resin layer 16, a colored layer as an ink layer may be formed in order to identify an optical fiber. Alternatively, the secondary resin layer 15 may be a colored layer. It is preferable that the colored layer contains a pigment, from the viewpoint of improving identification of the optical fiber. Examples of the pigment include a colored pigment such as carbon black, titanium oxide and zinc flower, a magnetic powder such as γ-$Fe_2O_3$, a mixed crystal of γ-$Fe_2O_3$ and γ-$Fe_3O_4$, $CrO_2$, cobalt ferrite, cobalt-deposited iron oxide, barium ferrite, Fe—Co and Fe—Co—Ni, an inorganic pigment such as MIO, zinc chromate, strontium chromate, aluminum tripolyphosphate, zinc, alumina, glass and mica; and an organic pigment such as an azo-based pigment, a phthalocyanine-based pigment, and a dyed lake pigment. The pigment may be subjected to treatments such as various types of surface modification and pigment hybridization.

(Optical Fiber Ribbon)

Figure 2:
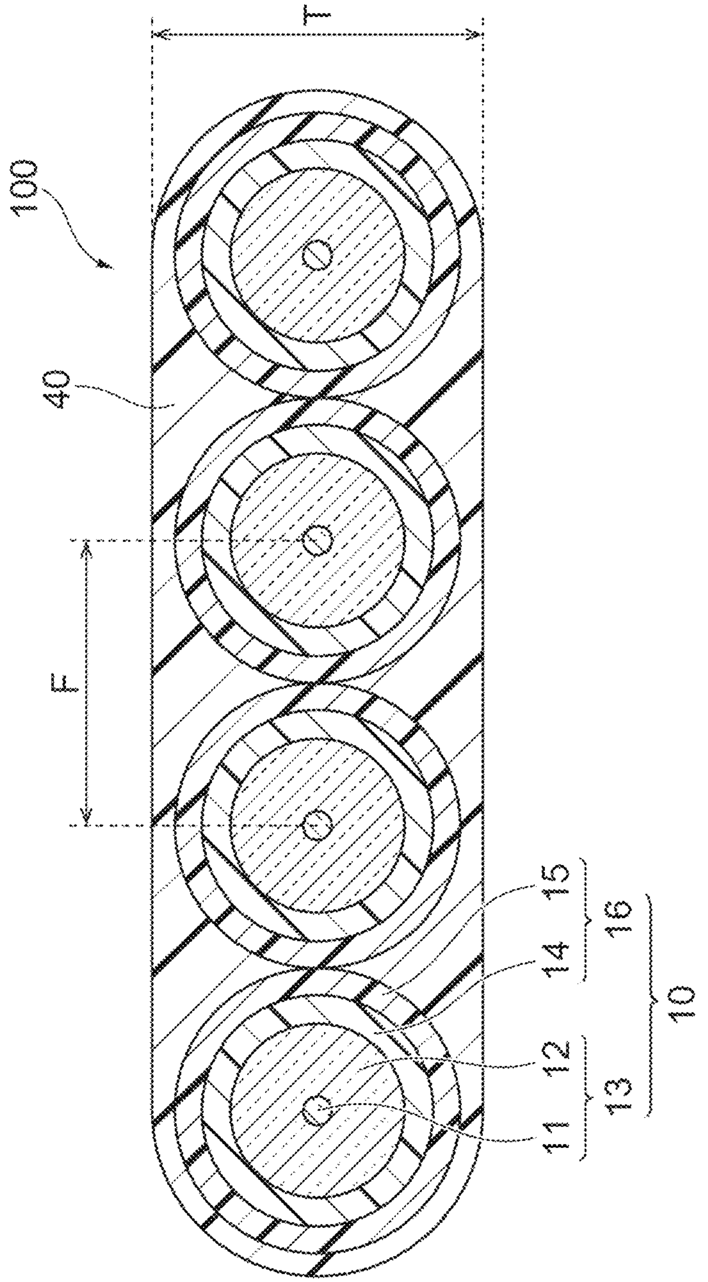
FIG. 2 is a cross-sectional view showing an example of an optical fiber ribbon according to the present embodiment.

An optical fiber ribbon may be prepared by using the optical fiber according to the present embodiment. FIG. 2 is a schematic cross-sectional view showing an optical fiber ribbon according to an embodiment. An optical fiber ribbon 100 has a plurality of optical fibers 10 and a connecting resin layer 40 in which the optical fibers 10 are (integrally) coated with a ribbon resin and connected. In FIG. 2, four optical fibers 10 are shown as an example, though the number thereof is not particularly limited. The optical fiber ribbon according to the present embodiment has superior transmission characteristics at low temperature.

The optical fibers 10 in contact with each other in parallel may be integrated, or a part or all of the optical fibers 10 in parallel at regular intervals may be integrated. The distance F between the centers of the adjacent optical fibers 10 may be 220 μm or more and 280 μm or less. In the case where the distance between the centers is controlled to 220 μm or more and 280 μm or less, it is easy to place the optical fibers in existing V-grooves, so that an optical fiber ribbon having excellent batch fusion splicing property can be obtained. The thickness T of the optical fiber ribbon 100 may be 164 μm or more and 285 μm or less, though depending on the outer diameter of the optical fiber 10. The resin for ribbons is not particularly limited, and a connecting resin layer may contain, for example, a urethane (meth)acrylate resin.

EXAMPLES

Hereinafter, the results of the evaluation tests in Experimental Examples (Examples and Comparative Examples) according to the present disclosure will be shown to describe the present disclosure in more detail. The present invention, however, is not limited to these Examples.

(Synthesis of Urethane Acrylate)

(UA-1)

Polypropylene glycol having an Mn of 2000, isophorone diisocyanate, and hydroxyethyl acrylate were reacted using dibutyltin dilaurate as tin catalyst to synthesize urethane acrylate (UA-1). Dibutyltin dilaurate was added such that the amount of tin contained in the coating resin layer was 60 ppm.

(UA-2)

Polypropylene glycol having an Mn of 1500, isophorone diisocyanate, and hydroxyethyl acrylate were reacted using dibutyltin dilaurate to synthesize urethane acrylate (UA-2). Dibutyltin dilaurate was added such that the amount of tin contained in the coating resin layer was 60 ppm.

(UA-3)

Polypropylene glycol having an Mn of 1500, isophorone diisocyanate, and hydroxyethyl acrylate were reacted using dibutyltin dilaurate to synthesize urethane acrylate (UA-3). Dibutyltin dilaurate was added such that the amount of tin contained in the coating resin layer was 100 ppm.

(UA-4)

Polypropylene glycol having an Mn of 1000, isophorone diisocyanate, and hydroxyethyl acrylate were reacted using dibutyltin dilaurate to synthesize urethane acrylate (UA-4). Dibutyltin dilaurate was added such that the tin content in the coating resin layer was 60 ppm.

(UA-5)

Polypropylene glycol having an Mn of 700, isophorone diisocyanate, and hydroxyethyl acrylate were reacted using dibutyltin dilaurate to synthesize urethane acrylate (UA-5). Dibutyltin dilaurate was added such that the amount of tin contained in the coating resin layer was 60 ppm.

(UA-6)

Polypropylene glycol having an Mn of 3000, isophorone diisocyanate, and hydroxyethyl acrylate were reacted using dibutyltin dilaurate to synthesize urethane acrylate (UA-6). Dibutyltin dilaurate was added such that the amount of tin contained in the coating resin layer was 60 ppm.

(UA-7)

Polypropylene glycol having an Mn of 1500, isophorone diisocyanate, and hydroxyethyl acrylate were reacted using dibutyltin dilaurate to synthesize urethane acrylate (UA-7). Dibutyltin dilaurate was added such that the amount of tin contained in the coating resin layer was 200 ppm.

(First Resin Composition for Primary Resin)

Resin composition P1 was prepared by mixing 70 parts by mass of silicone diacrylate (organopolysiloxane having an acryloyl group at both ends), 25 parts by mass of nonylphenol ethylene oxide-modified acrylate, and 5 parts by mass of Omnirad TPO.

Experimental Example 1

(Second Resin Composition for Secondary Resin Layer)

Resin composition S1 was prepared by mixing 58 parts by mass of urethane acrylate (UA-1), 20 parts by mass of bisphenol Abase epoxy acrylate, 10 parts by mass of isobornyl acrylate, 10 parts by mass of N-vinylcaprolactam, and 2 parts by mass of Omnirad TPO.

(Optical Fiber)

A resin composition P1 for the primary resin layer and a resin composition S1 for the secondary resin layer were applied to the outer periphery of a glass fiber having a diameter of 125 μm composed of a core and a cladding, and then the resin compositions were cured by irradiation with ultraviolet rays to form a primary resin layer having a thickness of 35 μm and a secondary resin layer having a thickness of 25 μm around the primary resin layer, so that an optical fiber having an outer diameter of 245 μm was prepared. The line speed was 500 m/min.

Experimental Example 2

A resin composition S2 was prepared by mixing 58 parts by mass of urethane acrylate (UA-2), 20 parts by mass of bisphenol Abase epoxy acrylate, 10 parts by mass of isobornyl acrylate, 10 parts by mass of N-vinylcaprolactam, and 2 parts by mass of Omnirad TPO. An optical fiber was prepared in the same manner as in Experimental Example 1, except that the resin composition S2 was used as the resin composition for the secondary resin layer.

Experimental Example 3

A resin composition S3 was prepared by mixing 58 parts by mass of urethane acrylate (UA-3), 20 parts by mass of bisphenol Abase epoxy acrylate, 10 parts by mass of isobornyl acrylate, 10 parts by mass of N-vinylcaprolactam, and 2 parts by mass of Omnirad TPO. An optical fiber was prepared in the same manner as in Experimental Example 1, except that the resin composition S3 was used as the resin composition for the secondary resin layer.

Experimental Example 4

A resin composition S4 was prepared by mixing 58 parts by mass of urethane acrylate (UA-4), 20 parts by mass of bisphenol Abase epoxy acrylate, 10 parts by mass of isobornyl acrylate, 10 parts by mass of N-vinylcaprolactam, and 2 parts by mass of Omnirad TPO. An optical fiber was prepared in the same manner as in Experimental Example 1, except that the resin composition S4 was used as the resin composition for the secondary resin layer.

Experimental Example 5

A resin composition S5 was prepared by mixing 48 parts by mass of urethane acrylate (UA-4), 40 parts by mass of bisphenol Abase epoxy acrylate, 10 parts by mass of isobornyl acrylate, and 2 parts by mass of Omnirad TPO. An optical fiber was prepared in the same manner as in Experimental Example 1, except that the resin composition S5 was used as the resin composition for the secondary resin layer.

Experimental Example 6

A resin composition S6 was prepared by mixing 58 parts by mass of urethane acrylate (UA-5), 20 parts by mass of bisphenol Abase epoxy acrylate, 10 parts by mass of isobornyl acrylate, 10 parts by mass of N-vinylcaprolactam, and 2 parts by mass of Omnirad TPO. An optical fiber was prepared in the same manner as in Experimental Example 1, except that the resin composition S6 was used as the resin composition for the secondary resin layer.

Experimental Example 7

A resin composition S7 was prepared by mixing 48 parts by mass of urethane acrylate (UA-6), 40 parts by mass of bisphenol Abase epoxy acrylate, 10 parts by mass of isobornyl acrylate, and 2 parts by mass of Omnirad TPO. An optical fiber was prepared in the same manner as in Experimental Example 1, except that the resin composition S7 was used as the resin composition for the secondary resin layer.

Experimental Example 8

A resin composition S8 was prepared by mixing 58 parts by mass of urethane acrylate (UA-6), 20 parts by mass of bisphenol Abase epoxy acrylate, 10 parts by mass of isobornyl acrylate, 10 parts by mass of N-vinylcaprolactam, and 2 parts by mass of Omnirad TPO. An optical fiber was prepared in the same manner as in Experimental Example 1, except that the resin composition S8 was used as the resin composition for the secondary resin layer.

Experimental Example 9

A resin composition S9 was prepared by mixing 58 parts by mass of urethane acrylate (UA-7), 20 parts by mass of bisphenol Abase epoxy acrylate, 10 parts by mass of isobornyl acrylate, 10 parts by mass of N-vinylcaprolactam, and 2 parts by mass of Omnirad TPO. An optical fiber was prepared in the same manner as in Experimental Example 1, except that the resin composition S9 was used as the resin composition for the secondary resin layer.

The optical fibers prepared in Experimental Examples 1 to 9 were subjected to the following evaluations. The results are shown in Table 1.

(Young's Modulus of Secondary Resin Layer)

The Young's modulus of the secondary resin layer was obtained from the 2.5% secant line value in a tensile test (distance between marked lines: 25 mm) at 23° C. of a pipe-shaped coating resin layer (length: 50 mm or more) obtained by immersing an optical fiber in a solvent (ethanol: acetone=3:7) and pulling a glass fiber out.

(Content of Tin in Coating Resin Layer)

A sample was prepared by adding 7 mL of nitric acid and 1 mL of 46 mass % hydrofluoric acid to 0.05 g of the coating resin layer peeled off from the optical fiber and heating the mixture at 220° C. for 15 minutes in a microwave decomposition apparatus. Subsequently, pure water was added to the sample to adjust the volume to 50 mL, and the content of tin was measured using a high frequency inductively coupled plasma emission spectrometer ("ICP-MS Agilent 7700x" manufactured by Agilent Technologies).

(Oil Resistance)

The optical fiber was immersed in a mineral oil at 85° C. for 30 days such that the entire coating resin layer was completely immersed. The transmission characteristics of signals having a wavelength of 1550 nm were measured under temperature conditions at 23° C. and −40° C., respectively, and the transmission losses at 23° C. and −40° C. were evaluated. A case of a difference obtained by subtracting the transmission loss at 23° C. from the transmission loss at −40° C. (transmission loss difference) of 0.05 dB/km or less (transmission loss is smaller at −40° C.) was evaluated as "A", and a case of a transmission loss difference of more than 0.05 dB/km was evaluated as "B".

(Lateral Pressure Characteristics)

The optical fiber was wound around a silica glass bobbin with a diameter of 280 mm coated with sandpaper (No. 1000), and the transmission characteristics of a signal with a wavelength of 1550 nm were measured under temperature conditions of 23° C. and −40° C., respectively, for evaluation of the transmission loss difference. The evaluation was rated as "A" for a transmission loss difference of 0.1 dB/km or less, "B" for a transmission loss difference of more than 0.1 dB/km and 0.3 dB/km or less, and "C" for a transmission loss difference of more than 0.3 dB/km.

TABLE 1

| | Experimental Example | | | | | | | | |
|---|---|---|---|---|---|---|---|---|---|
| | 1 | 2 | 3 | 4 | 5 | 6 | 7 | 8 | 9 |
| Resin composition | S1 | S2 | S3 | S4 | S5 | S6 | S7 | S8 | S9 |
| Young's modulus (MPa) | 100 | 200 | 200 | 500 | 800 | 1500 | 200 | 50 | 200 |
| Content of tin (ppm) | 60 | 60 | 100 | 60 | 60 | 60 | 60 | 60 | 200 |
| Oil resistance | A | A | A | A | A | A | A | A | B |
| Lateral pressure characteristics | B | B | B | B | A | A | B | C | B |

By comparing Experimental Examples 1 to 8 with Experimental Example 9, it can be confirmed that the oil resistance of the optical fiber is improved by reducing the amount of tin contained in the coating resin layer.

REFERENCE SIGNS LIST

10: OPTICAL FIBER
11: CORE
12: CLADDING
13: GLASS FIBER
14: PRIMARY RESIN LAYER
15: SECONDARY RESIN LAYER
16: COATING RESIN LAYER
40: CONNECTING RESIN LAYER
100: OPTICAL FIBER RIBBON

The invention claimed is:

1. An optical fiber comprising:
a glass fiber comprising a core and a cladding, and a coating resin layer for coating the glass fiber;
wherein the coating resin layer has a primary resin layer in contact with the glass fiber for coating the glass fiber, and a secondary resin layer for coating the primary resin layer;
the primary resin layer includes a cured product of a first resin composition containing a silicone (meth)acrylate and a photopolymerization initiator;
the secondary resin layer includes a cured product of a second resin composition containing a urethane (meth) acrylate and a photopolymerization initiator; and
an amount of tin contained in the coating resin layer is 150 ppm or less in a mass ratio.

2. The optical fiber according to claim 1, wherein a Young's modulus of the secondary resin layer is 80 MPa or more and 2000 MPa or less at 23° C.

3. The optical fiber according to claim 1, wherein the second resin composition further contains an epoxy (meth) acrylate having an aromatic ring.

4. The optical fiber according to claim 1, wherein the amount of tin is 10 ppm or more in a mass ratio.

5. The optical fiber according to claim 1, wherein the first resin composition further contains nonylphenol ethylene oxide-modified (meth)acrylate.

6. An optical fiber ribbon comprising:
a plurality of the optical fibers according to claim 1 arranged in parallel; and
a connecting resin layer for coating and connecting a plurality of the optical fibers.

7. The optical fiber according to claim 2, wherein the second resin composition further contains an epoxy (meth) acrylate having an aromatic ring.

8. The optical fiber according to claim 2, wherein the amount of tin is 10 ppm or more in a mass ratio.

9. The optical fiber according to claim 3, wherein the amount of tin is 10 ppm or more in a mass ratio.

10. The optical fiber according to claim 7, wherein the amount of tin is 10 ppm or more in a mass ratio.

11. The optical fiber according to claim 2, wherein the first resin composition further contains nonylphenol ethylene oxide-modified (meth)acrylate.

12. The optical fiber according to claim 3, wherein the first resin composition further contains nonylphenol ethylene oxide-modified (meth)acrylate.

13. The optical fiber according to claim 4, wherein the first resin composition further contains nonylphenol ethylene oxide-modified (meth)acrylate.

14. The optical fiber according to claim 7, wherein the first resin composition further contains nonylphenol ethylene oxide-modified (meth)acrylate.

15. The optical fiber according to claim 8, wherein the first resin composition further contains nonylphenol ethylene oxide-modified (meth)acrylate.

16. The optical fiber according to claim 9, wherein the first resin composition further contains nonylphenol ethylene oxide-modified (meth)acrylate.

17. The optical fiber according to claim 10, wherein the first resin composition further contains nonylphenol ethylene oxide-modified (meth)acrylate.

* * * * *